Figure 1:
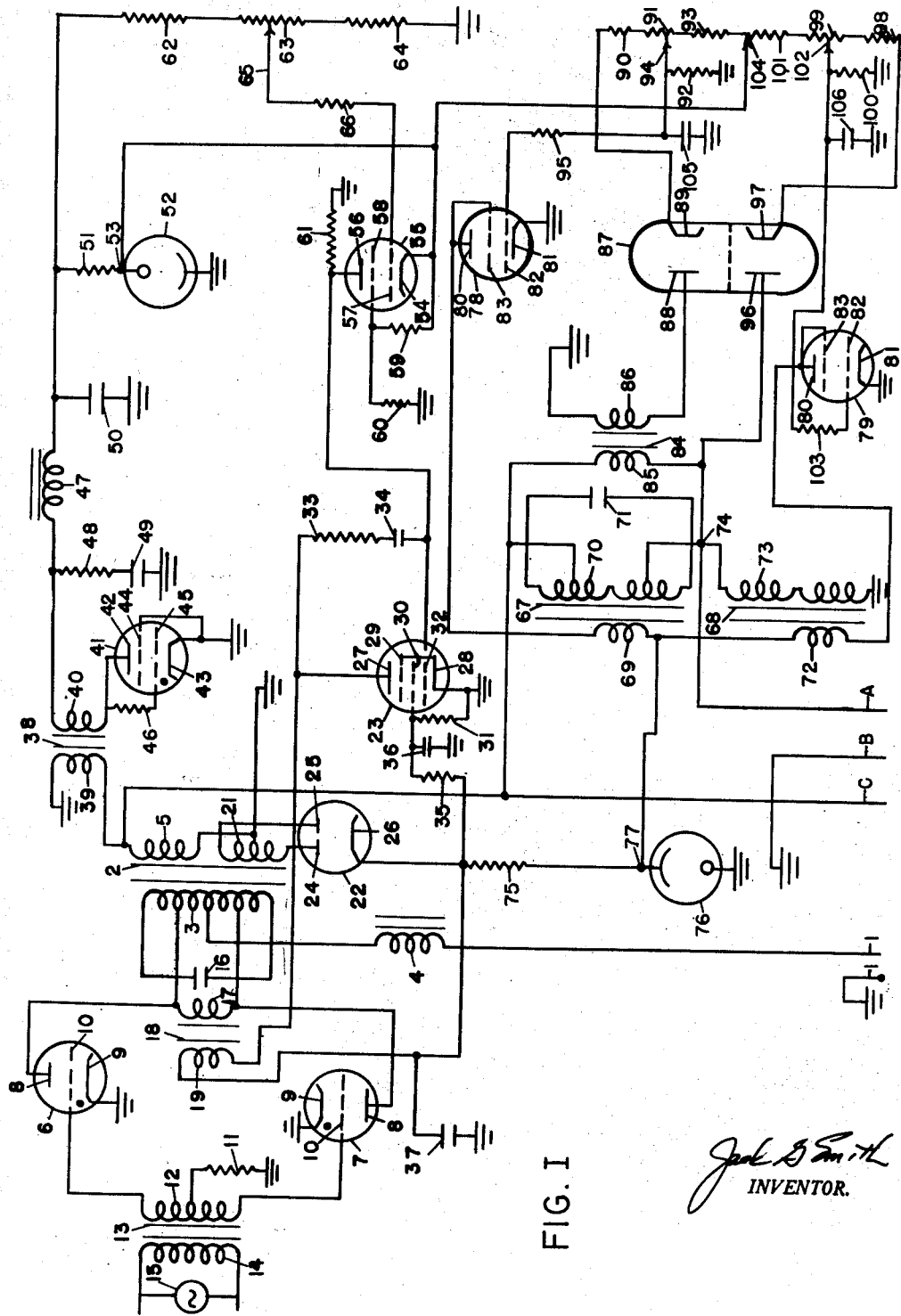

March 30, 1954 J. G. SMITH 2,673,954
PHASE CONVERTER
Filed Oct. 3, 1949 2 Sheets-Sheet 1

FIG. I

*Jack G Smith*
INVENTOR.

March 30, 1954

J. G. SMITH 2,673,954

PHASE CONVERTER

Filed Oct. 3, 1949

2 Sheets-Sheet 2

FIG. 2

Jack G. Smith
INVENTOR.

BY Walter J. Jagmin

ATTORNEY

Patented Mar. 30, 1954

2,673,954

UNITED STATES PATENT OFFICE 2,673,954

PHASE CONVERTER

Jack G. Smith, Garland, Tex.

Application October 3, 1949, Serial No. 119,263

14 Claims. (Cl. 321—52)

My invention relates to electric circuits and more particularly to electric regulating circuits for systems for transmitting energy from a single phase alternating current circuit to a polyphase alternating current circuit.

In many applications it is important to supply a constant voltage polyphase alternating current to a polyphase alternating current circuit from a single phase alternating current supply circuit. In accordance with the teachings of my invention, I provide a new and improved electric regulating system which operates to maintain constant phase voltages in the polyphase alternating current output circuit.

It is an object of my invention to provide a new and improved electric regulating system.

It is another object of my invention to provide a new and improved electric regulating system for apparatus which transmits energy from a single phase alternating current circuit to a polyphase alternating current circuit.

It is another object of my invention to provide a new and improved voltage regulating circuit for apparatus which transmits energy from a single phase alternating current circuit to a polyphase alternating current circuit.

It is a still further object of my invention to provide a new and improved circuit for converting a single phase alternating current to a plurality of alternating currents displaced in phase from one another in a predetermined manner.

Briefly stated, in the illustrated embodiment of my invention, I provide an improved regulating system for supplying constant voltage polyphase alternating current to a polyphase output circuit from a single phase alternating current input circuit. The system comprises a pair of controlled saturable reactors whose reactive windings are connected in series across the single phase alternating current input circuit. A capacitance is connected across one reactive winding to advance the phase of the voltage across this reactive winding. The inductance of the second reactive winding retards the phase of the voltage across the other reactive winding. A three phase alternating current output circuit is thus formed by the two terminals of the single phase alternating current circuit and the juncture or common connection of the reactive windings of the saturable reactors. The saturable reactors are also provided with saturating windings which are energized by a unidirectional current in accordance with the voltage across their respective reactive windings. Voltage sensing circuits or voltage controlling circuits are connected across each reactive winding to control the conductivity of electric discharge means which are connected in series relation with each saturation winding to thus control the voltages and the phase displacements of the voltages across the reactive windings.

For a better understanding of my invention, reference may be had to the following description taken in connection with the accompanying drawing, and its scope will be pointed out in the appended claims.

Figure 1 of the accompanying drawing diagrammatically illustrates my invention as applied to the inverter which forms the subject of a separate application, Serial Number 107,733, now Patent No. 2,638,569, filed July 30, 1949, by William J. Holt, Jr., Varo Manufacturing Company of Garland, Texas, is the common assignee of the above application and this application. The inverter shown and claimed in the above identified application forms no part of my present invention but is used merely to illustrate a method of applying my present invention to a single phase alternating current circuit. Figure 2 is a diagrammatic illustration of a modified form of the device illustrated in Figure 1.

Referring now to Figure 1 of the accompanying drawing, my invention is diagrammatically illustrated as applied to a system for energizing a three phase alternating current output circuit ABC from a direct current supply circuit 1, 1 by transmitting energy from the direct current supply circuit 1, 1 through an electric translating apparatus to produce a single phase alternating current and then converting the single phase alternating current into three phase alternating current. The electric translating apparatus comprises an electric valve inverter of the parallel type comprising a transformer 2 provided with a primary winding 3 having its electric midpoint connected to one side of the direct current supply circuit 1, 1 through a smoothing reactor 4 and a secondary winding 5 connected to phase BC of the three phase current output circuit ABC. Primary winding 3 is connected to the other side of the direct current circuit 1, 1 through electric valves 6 and 7. Each of the electric valves 6 and 7 is provided with an anode 8, a cathode 9 and a control grid 10 and may be of any of the several types well known in the art although I prefer to employ electric valves of the gaseous type.

In order periodically to render the valves 6 and 7 alternately conductive and nonconductive, their grids 10 are connected to their common cathode circuit through current limiting resistance 11 and opposite halves of the secondary winding 12 of a grid transformer 13, the primary winding 14 of which may be energized from any suitable source of alternating current 15 of a frequency which it is desired to supply to the circuit ABC. A capacitor 16 is preferably connected across the winding 3 to effect the commutation of current between electric valves 6 and 7. Valves 6 and 7 are connected to the direct current supply circuit through an intermediate portion of primary winding 3 while capacitor 16 is connected across the whole of primary winding 3 in order to impress a higher voltage on capacitor 16 and thus reduce the required size and capacity of capacitor 16. In order to control the voltage of the alternating current in phase BC of the alternating current load circuit ABC, the reactive winding 17 of a saturable reactor 18 is connected across the intermediate portion of primary winding 3 and between the anodes 8 of electric valves 6 and 7. Saturable reactor 18 is provided with control or saturating winding 19 which is energized in accordance with the voltage of phase BC by a direct current circuit. Since reactive winding 17 is in parallel relationship with capacitor 16 it tends to act as a shunt around capacitor 16 when the impedance of reactive winding 17 is low and to decrease the voltage of the alternating current in secondary winding 5 of transformer 2. Conversely, the voltage of secondary winding 5 is increased when the impedance of reactive winding 17 is increased.

Stated in other words, the inductance of reactive winding 17 is varied in accordance with voltage of phase BC in order to maintain a constant impedance in the anode-cathode circuits of electric valves 6 and 7. By varing the direct current flowing in saturating winding 19 in accordance with the voltage of the alternating current in secondary winding 5, the voltage of phase BC can be maintained constant. The control means for varying the direct current in saturating winding 19 will be described later.

The general principles of operation of the above described inverter are well understood by those skilled in the art. In brief, if one of the valves, for example valve 6, is initially rendered conductive, current will flow through upper portion of the primary winding 3 and electric valve 6, inducing one-half cycle of alternating current in the secondary winding 5. During this interval, the capacitor 16 becomes charged to substantially twice the potential of the direct current supply circuit 1, and, when the control grid 10 potential supplied by the transformer 13 reverses polarity to render the electric valve 7 conductive, the energy of capacitor 16 is effective to commutate the current from the electric valve 6 to the electric valve 7. Current now flows in the lower portion of winding 3 inducing a half cycle of alternating current of opposite polarity in the secondary winding 5. In this manner the current is successively commutated between the valves 6 and 7 and an alternating current is supplied to phase BC. Phase BC constitutes a single phase alternating current.

In order to maintain the voltage of the alternating current in phase BC constant, I provide a direct current energizing circuit for saturating winding 19 which comprises a secondary winding 21 on transformer 2, an electric valve 22 for rectifying the alternating current induced in the secondary winding 21, and an electric discharge means 23 for controlling the current flowing through saturating winding 19. Electric valve 22 acts as a full wave rectifier and comprises anodes 24 and 25 and a cathode 26. Electric discharge means 23 is preferably of the high vacuum type and comprises an anode 27, a cathode 28, a suppressor grid 29 which is connected to the cathode, a screen grid 30 which is connected to the cathode through a resistance 31, and a control grid 32. Control grid 32 is connected to the anode through a resistance 33 and a capacitor 34 in order to prevent high frequency oscillation of electric discharge means 23. Screen grid 30 is connected to cathode 26 through a resistance 35 and to ground through a filter condenser 36. Another filter condenser 37 may be connected to cathode 26 and to ground, as illustrated. Secondary winding 21 is provided with an electric midpoint which is connected to cathode 28 of electric discharge means 23 through ground. It will be apparent to those skilled in the art that the direct current flowing in saturating winding 19 can be controlled by varying the conductivity of electric discharge means 23.

In order to vary the conductivity of electric discharge means 23 in accordance with the voltage of alternating current of phase BC, I provide a control circuit which comprises a voltage sensing transformer 38 having a primary winding 39 connected in parallel relationship with the secondary winding 5. The voltage across primary winding 39, and therefore the voltage induced in secondary winding 40 of transformer 38, will vary in accordance with the voltage of secondary winding 5. One side of secondary winding is connected to an electric valve 41 which acts as a diode rectifier. Electric valve 41 is provided with an anode 42, a cathode 43, a suppressor grid 44 which is connected to the cathode 43 and a shield grid 45 connected to the anode 42 through a resistance 46. Electric valve 41 may be of any of the several types well known in the art although I prefer to utilize a valve of the gas electric discharge type. Connected across secondary winding 40 and electric valve 41 is a filter comprising a smoothing reactor 47, a resistance 48, and condensers 49 and 50. Also connected across secondary winding 40 and electric valve 41 is a voltage divider which comprises in series relation a resistance 51 and a glow discharge valve 52. Glow discharge valve 52 acts as a voltage regulator in a manner well understood by those skilled in the art. The common juncture 53 of resistance 51 and glow discharge valve 52 is connected to the cathode 54 of an electric discharge means 55 to maintain the potential of cathode 54 substantially constant. Electric discharge means 55 is preferably of the high vacuum type and comprises an anode 56, a control grid 57, and a screen grid 58 connected to the cathode 54 through a resistance 59 and to ground through a resistance 60. The anode 56 is connected to control grid 32 of electric discharge means 23. Electric discharge means 55 is connected across glow discharge valve 52 through a resistance 61.

A second voltage divider which comprises in series relation resistances 62, 63 and 64 is also connected across secondary winding 40 and electric valve 41. A voltage control or voltage adjusting contact 65 is connected to control grid 57 through a limiting resistance 66 and impresses on control grid 57 a potential which varies in accordance with the voltage of phase BC. For example, if the voltage of phase BC increases, a more negative potential is impressed on control grid 57, the conductivity of electric discharge means 55 is decreased, control grid 32 of electric discharge means 23 becomes more positive, and the flow of current through saturating winding 19 is increased. The impedance of reactive winding 17 is therefore decreased and the voltages of primary winding 3 and secondary winding 5 decrease. Conversely, if the voltage of phase BC decreases, the voltage of secondary winding 5 is increased. The voltage of phase BC is thus maintained substantially constant.

While I have described a source of constant voltage single phase alternating current which is readily adaptable to use with my present invention, it is obvious that many modifications of the circuit are possible. For example, the saturable reactor 18 could be connected across secondary winding 5 of transformer 2. Saturable reactor 18 could also be connected across any single phase alternating current circuit to maintain the voltage of the circuit constant and thus make the circuit suitable for use with my present invention.

In order to change the single phase alternating current of phase BC into three phase alternating current, I provide a phase converting apparatus which comprises saturable reactors 67 and 68 connected in series relation across phase BC. Saturable reactor 67 comprises a saturating winding 69 and a reactive winding 70. A capacitor 71 is connected across reactive winding 70. Saturable reactor 68 comprises a saturating winding 72 and a reactive winding 73. The juncture or common connection 74 of reactive windings 70 and 73 constitutes the third terminal of the three phase load circuit ABC. Capacitor 71 and reactive winding 70 are of such magnitudes that they act, in combination, as a capacitance to advance the voltage across them 120°. Reactive winding 73 acts as an inductance to retard its voltage 120°. Since the voltages across AC, AB, and BC are displaced 120° from each other, the circuit ABC constitutes a three phase alternating current circuit. The voltages across the circuit ABC, however, are equally displaced in phase by 120° only for a particular value of the current in circuit ABC if the capacitance of reactive winding 70 and capacitor 71 and the inductance of reactive winding 73 are fixed values. It will be obvious to those skilled in the art that the voltages of circuit ABC will remain equally displaced in phase by 120° only as long as the voltages of phases AB, AC and BC are of equal value.

In order to maintain constant equal voltages across phases AB, AC and BC and to maintain these voltages equally displaced in phase by 120°, I provide means to vary the values of the capacitance of reactive winding 70 and capacitor 71 and the inductance of reactive winding 73 in accordance with the voltages of phases AC and AB, respectively, by varying the unidirectional current flowing through saturating windings 69 and 72. Saturating windings 69 and 72 are energized by unidirectional current transmitted by valve 22. A voltage divider comprising a resistance 75 and a glow discharge valve 76, which acts as a voltage regulator, are connected in series relation between the cathode 26 of electric valve 22 and ground. Saturating windings 69 and 72 are connected to the juncture or common connection 77 of resistance 75 and glow discharge valve 76 and, since glow discharge valve 76 acts as a voltage regulator, a constant voltage is applied to saturating winding 69 and electric discharge means 78 and saturating winding 72 and electric discharge means 79. Electric discharge means 78 is connected in series relationship with saturating winding 69, resistance 75, electric valve 22 and secondary winding 21. Electric discharge means 79 is similarly connected in series relation with saturating winding 72, resistance 75, electric valve 22 and secondary winding 21. It can be seen now that the amount of unidirectional current flowing through saturating windings 69 and 72 can be controlled by varying the conductivity of electric discharge means 78 and 79, respectively. Electric discharge means 78 and 79 may be of any of the several types well known in the art but are preferably of the high vacuum type and comprises an anode 80, a cathode 81, a control grid 82, and a screen grid 83 connected to the anode 80.

As a means for controlling the potential of control grid 82 of electric discharge means 78 in accordance with the voltage of phase AC, I provide a voltage sensing transformer 84 having a primary winding 85 connected across phase AC and a secondary winding 86 connected in series relationship with an electric valve means 87. The upper electric discharge path of electric valve means 87 includes anode 88 and cathode 89 and transmits a unidirectional current through resistances 90, 91, current limiting resistance 92 and secondary winding 86. Resistances 90, 91 and 93 are connected in series relation and form a voltage divider. A voltage control or voltage adjusting contact 94 is connected to control grid 82 of electric discharge means 78 through a current limiting resistance 95 and impresses on control grid 82 a potential which varies in accordance with the voltage of phase AC. Thus if the voltage of phase AC increases, the voltage of secondary winding 86 increases, electric valve 87 will transmit more current between anode 88 and cathode 89, and a more positive potential will be impressed on control grid 82 of electric discharge means 78. The conductivity of electric discharge means 78 being increased, a greater current will flow through saturating winding 69 decreasing the inductance of reactive winding 70 and thus decreasing the voltage of phase AC. Conversely, if the voltage of phase AC decreases, the current in saturating winding 69 will decrease and the voltage of phase AC will be increased. In this manner the voltage of phase AC is maintained substantially constant.

The voltage of phase AB is similarly maintained constant. The lower electric discharge path of electric valve means 87 includes anode 96 and cathode 97 and is connected in series relation with resistances 98, 99 and 100 across phase AB. Resistances 98, 99 and 101 are connected in series relation and constitute a voltage divider. A voltage control or voltage adjusting contact 102 is connected to control grid 82 of electric discharge means 79 through current limiting resistance 103 and impresses on the control grid 82 of electric discharge means 79 a potential which varies in accordance with the voltage of phase AB. For example, if the voltage of phase AB increases, the current transmitted by electric valve 87 between anode 96 and cathode 97 will increase, a more positive potential will be impressed on control grid 82 of electric discharge means 79, more current will flow through saturating winding 72 decreasing the inductance of reactance winding 73 and thus decreasing the voltage of phase AB. Conversely, if the voltage of phase AB decreases, the inductance of reactance winding 73 will increase. In this manner the voltage of phase AB is maintained substantially constant.

Electric valve 87 being connected across phases AC and AB impresses a very high positive potential on control grids 82 through the voltage dividers which include resistances 90, 91 and 93 and resistances 98, 99 and 101. In order to reduce the potentials impressed on control grids 82 to normal operating values, I connect a source of negative potential to the juncture or common connection 104 of resistances 93 and 101 by connecting it to the juncture 53 of resistance 51 and glow discharge valve 52.

Voltage adjusting contacts 65, 94 and 102 can be set to maintain predetermined voltages across phases BC, AC and AB, respectively.

A filter condenser 105 may be connected between limiting resistance 95 and voltage control 94 and to ground which is in the return path for anode 88 and the secondary winding 86. A similar filter condenser 106 may be connected between limiting resistance 103 and voltage control 102 and to ground which is the return path for anode 96 and reactive winding 73.

It will be apparent to those skilled in the art that small variations in the voltages of phases AB, AC and BC will result in relatively large changes in the direct current flowing in saturating windings 19, 69 and 72, respectively, thus ensuring a very sensitive control of these voltages. The sensitivity of control of the phase voltages and of their phase displacements, the facility and rapidity with which the voltage and phase regulation is effected, and the simplicity of construction and arrangement are important advantages of apparatus built in accordance with my invention.

Figure 2 is a diagrammatic illustration of a modification of the device illustrated in Figure 1. Like reference characters in Figures 1 and 2 illustrate like elements. The three phase circuit ABC of Figure 1 cannot be changed, so far as I know, to a Y circuit except by the use of an additional transformer. In order to obviate the use of an additional transformer in application where interchangeable delta or Y output circuits are desired, I provide additional windings 107 and 108 on saturable reactors 67 and 68, respectively, which constitute legs A and B of the three phase Y output circuit ABC. The addition of secondary windings 107 and 108 in effect changes saturable reactors 67 and 68 into saturable transformers. Leg C of output circuit ABC is provided by a secondary winding 109 on transformer 2. One side of each of the windings 107, 108 and 109 are connected together to form the common connection 110 of the Y while the other sides of the windings 107, 108 and 109 constitute the output terminals A, B, and C. The capacitance 71 and reactive winding 73 are connected in series across primary winding 3 since secondary winding 5 of Figure 1 is not needed, the saturable reactors 67 and 68 now acting as saturable transformers. By selecting the proper ratios between the number of turns in windings 70 and 107, and in windings 73 and 108, the desired output voltages in legs A and B can be obtained. If it is so desired, however, winding 5 may be retained as in Figure 1 but the connection between winding 5 and winding 21 must be broken.

If winding 5 is not employed but capacitance 71 and reactive winding 73 are connected across primary winding 3, sensing transformer 38 is connected across winding 109, the control circuits for each phase AB, AC, and BC remaining unchanged in every other respect.

It will be readily apparent to those skilled in the art that the output circuit ABC can be easily changed from the Y connection illustrated in Figure 2 to a delta connection by disconnecting windings 107, 108 and 109 from common connection 110 and connecting these windings in delta.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a single phase alternating current input circuit; a polyphase alternating current output circuit having a plurality of terminals; and a phase converting apparatus comprising a plurality of saturable reactors, each of said saturable reactors having a reactive winding and a saturating winding, said reactive windings being connected in series relation across said single phase alternating current input circuit, the connection between said reactive windings constituting one of the terminals of said polyphase circuit, opposite ends of the series connected reactive windings constituting the other terminals of said polyphase circuit; a capacitance connected across one of said reactive windings; and means connected to said saturating windings for varying the current in said saturating windings in accordance with the voltages across the reactive windings of their respective saturable reactors to maintain substantially constant equal voltages across said reactive windings, said voltages having a predetermined constant phase difference.

2. In combination, a single phase alternating current input circuit; a polyphase alternating current output circuit having a plurality of terminals; and a phase converting apparatus comprising a plurality of saturable reactors, each of said reactors having a reactive winding and a saturating winding, said reactive windings being connected in series relation across said single phase alternating current input circuit, the connection between said reactive windings constituting one of the terminals of said polphase alternating current circuit, opposite ends of the series connected windings constituting the other terminals of said polyphase circuit; a capacitance connected across one of said reactive windings; and means connected to the saturating winding of each saturable reactor for varying the current in said saturating winding in accordance with the voltage across the corresponding reactive winding of each saturable reactor, said means comprising an electric discharge means connected in series with each saturating winding, and means responsive to variations in the voltage across the corresponding reactive winding to control the conductivity of said electric discharge means, the conductivity of each electric discharge means varying in accordance with the voltage of the corresponding reactive winding to maintain substantially constant equal voltages across said reactive windings; said voltages having a constant predetermined phase difference.

3. In combination: a single phase alternating current input circuit; a polyphase alternating current output circuit having a plurality of terminals; and a phase converting apparatus comprising a plurality of saturable reactors, each of said reactors having a reactive winding and a saturating winding, said reactive windings being connected in series relation across said single phase alternating current input circuit, the connection between said reactive windings constituting one of said terminals of said polyphase alternating current circuit, opposite ends of the series connected reactive windings constituting the other terminals of said polyphase circuit; a capacitance connected across one of said reactive windings; a source of unidirectional current connected to said saturating windings; and means responsive to the variation in the voltage across the reactive winding of each saturable reactor for controlling the current flowing from said source of unidirectional current through the corresponding saturating winding to maintain substantially constant equal voltages differing in phase by a predetermined constant amount across said reactive windings.

4. In combination: a single phase alternating current input circuit; a polyphase alternating current output circuit having a plurality of terminals; and a phase converting apparatus comprising a plurality of saturable reactors, each of said reactors having a reactive winding and a saturating winding, said reactive windings being connected in series relation across said single phase alternating current input circuit, the connection between said reactive windings constituting one of the terminals of said polyphase alternating current circuit, opposite ends of the series connected reactive windings constituting the other terminals of said polyphase circuit; a capacitance connected across one of said reactive windings; a source of unidirectional current connected to said saturating windings; and means responsive to the variation in the voltage across the reactive winding of each saturable reactor for controlling the current flowing from said source of unidirectional current through the corresponding saturating winding, said means comprising a plurality of electric discharge means each connected in series relation with the saturating winding of a saturable reactor, and voltage sensing means operatively associated with the reactive winding of each saturable reactor for controlling the conductivity of the corresponding electric discharge means, the conductivity of each electric discharge means varying in accordance with the voltage of the corresponding reactive winding to maintain substantially constant equal voltages across said reactive windings differing in phase by a predetermined degree.

5. In combination, a single phase alternating current input circuit; a three phase alternating current output circuit having three terminals; a plurality of reactive windings connected in series relation across said single phase alternating current input circuit, the connection between said reactive windings constituting a terminal of said three phase alternating current output circuit, opposite ends of the series connected reactive windings constituting the other terminals of said output circuit; means connected to each of said reactive windings remote from said connection constituting the other two terminals of said three phase circuit; a capacitance connected across one of said reactive windings; a voltage controlling means comprising a reactive winding connected across said single phase alternating current input circuit; and a plurality of means each operatively associated with one of the reactive windings and responsive to the voltage across its associated reactive winding to maintain a constant voltage across its associated reactive winding, the voltages across the reactive windings being equal and differing in phase by a predetermined amount.

6. In combination, a single phase alternating current input circuit; a three phase alternating current output circuit having three terminals; a phase converting apparatus comprising a plurality of saturable reactors, each reactor having a reactive winding and a saturating winding, said reactive windings being connected in series relation across said single phase alternating current input circuit, the connection between said reactive windings constituting one of the terminals of said three phase circuit, opposite ends of the series connected reactive windings constituting the other two terminals of the three phase circuit and a capacitance connected across one of said reactive windings; a voltage controlling means comprising a saturable reactor having a reactive winding and a saturating winding, said reactive winding being connected across said single phase alternating current input circuit; a source of unidirectional current connected to said saturating windings; and means for controlling the current flowing from said source of unidirectional current through each saturating winding in accordance with the voltage across its associated reactive winding to maintain the voltage across its associated reactive winding constant, the voltages across the reactive windings being equal and differing in phase by a predetermined amount.

7. In combination, a single phase alternating current input circuit; a three phase alternating current output circuit having three terminals; a phase converting apparatus comprising a plurality of saturable reactors, each reactor having a reactive winding and a saturating winding, said reactive windings being connected in series relation across said single phase alternating current input circuit, the connection between said reactive windings constituting one of the terminals of said three phase circuit, opposite ends of said reactive windings constituting the other two terminals of said three phase circuit and a capacitance connected across one of said reactive windings; a voltage controlling means comprising a saturable reactor having a reactive winding and a saturating winding, said reactive winding being connected across said single phase alternating current input circuit; a source of unidirectional current connected to energize said saturating windings; and a plurality of electric discharge means for individually controlling the current flowing from said source of unidirectional current through each saturating winding in accordance with the voltage across its associated reactive winding, the voltages across the reactive windings being equal and differing in phase by a predetermined amount.

8. In combination, a single phase alternating current input circuit; a three phase alternating current output circuit having three terminals; a phase converting apparatus comprising a plurality of saturable reactors, each reactor having a reactive winding and a saturating winding, said reactive windings being connected in series relation across said single phase alternating current input circuit, the connection between said reactive windings constituting one of the terminals of said three phase circuit, opposite ends of said reactive windings constituting the other two terminals of said three phase circuit and a capacitance connected across one of said reactive windings; a voltage controlling means comprising a saturable reactor having a reactive winding and a saturating winding, said reactive winding being connected across said single phase alternating current input circuit; a source of unidirectional current for energizing said saturating windings; a plurality of electric discharge means for individually controlling the energization of each saturating winding, said electric discharge means each having an anode, a cathode and a control grid, the anode-cathode circuits of said electric discharge means connecting said saturating windings to said source of unidirectional current; and means responsive to the voltage across said reactive windings for impressing on said control grids potentials to maintain the voltages across said reactive windings substantially constant, the voltages across the reactive windings being equal and differing in phase by a predetermind amount.

9. In a device for transmitting energy from a single phase alternating current input circuit to a polyphase alternating current output circuit; a plurality of saturable reactors each having a saturating winding and a reactive winding, said reactive windings being connected in series relation across said single phase alternating current input circuit, the connection between said reactive windings constituting a terminal of said polyphase alternating current output circuit, opposite ends of said reactive windings constituting other terminals of said polyphase circuit; a capacitance connected across one of said reactive windings; means to energize said saturating windings; and means responsive to the voltages across said reactive windings for controlling the energization of said saturating windings to maintain constant equal voltages across said reactive windings.

10. In a device for transmitting energy from a single phase alternating current input circuit to a polyphase alternating current output circuit; a plurality of saturable reactors each having a saturating winding and a reactive winding, said reactive windings being connected in series relation across said single phase alternating current input circuit, the connection between said reactive windings constituting a terminal of said polyphase alternating current output circuit, opposite ends of said reactive windings constituting other terminals of said polyphase circuit; a capacitance connected across one of said reactive windings; means to energize said saturating windings; and means responsive to the voltages across said reactive windings for controlling the energization of said saturating windings to maintain constant voltages across said reactive windings, said last named comprising a plurality of electric discharge means, each serially connected with one of said saturating windings, and means responsive to the voltages across said reactive windings for controlling the conductivities of said electric discharge means to maintain constant equal voltages across said reactive windings.

11. In combination: a single phase alternating current input circuit; a plurality of saturable reactors, each of said reactors comprising a reactive winding and a saturating winding, said reactive windings being connected in series across said input circuit; a capacitance across one of said reactive windings; a transformer having a primary winding connected across said input circuit; secondary windings on said transformer and said saturable reactors, said secondary windings being connected in Y to provide a three phase output circuit, the ends of the secondary windings remote from the common connection of the Y constituting terminals of said polyphase circuit; and means operatively associated with each of said reactive windings to energize each of said saturating windings in accordance with the voltage across its associated reactive winding.

12. In combination: a single phase alternating current input circuit; a plurality of saturable reactors, each of said reactors comprising a reactive winding and a saturating winding, said reactive windings being connected in series across said input circuit; a capacitance across one of said reactive windings; a transformer having a primary winding connected across said input circuit; secondary windings on said transformer and said saturable reactors, said secondary windings being connected in Y to provide a three phase output circuit, the ends of the secondary windings remote from the common connection of the Y constituting terminals of said polyphase circuit; voltage sensing means operatively associated with each of said reactive windings; and means operatively associated with said sensing means for energizing each of said saturation windings in accordance with the voltage across its associated reactive winding, the voltages across said reactive windings being equal.

13. In a device for transmitting energy from a single phase alternating current input circuit to a three phase alternating current output circuit: a plurality of saturable reactors each having a saturating winding and a reactive winding, said reactive windings being connected in series relation across said single phase alternating current input circuit, the connection between said reactive windings constituting a terminal of said three phase alternating current output circuit, opposite ends of said reactive windings constituting other terminals of said three phase circuit; a capacitance connected across one of said reactive windings; means for energizing said saturating windings with direct current; and means responsive to the voltages across said reactive windings for controlling the energization of said saturating windings to maintain constant equal voltages across said reactive windings.

14. In a device for transmitting energy from a single phase alternating input circuit to a three phase alternating current output circuit; a plurality of saturable reactors each having a saturating winding and a reactive winding, said reactive windings being connected in series relation across said single phase alternating current input circuit, the connection between said reactive windings constituting a terminal of said three phase alternating current output circuit, opposite ends of said reactive windings constituting other terminals of said three phase circuit; a capacitance connected across one of said reactive windings; means for energizing said saturating windings with direct current; and means responsive to the voltages across said reactive windings for controlling the energization of said saturating windings to maintain constant voltages across said reactive windings, said last named means comprising a plurality of electric discharge means each serially connected with one of said saturating windings, and means responsive to the voltages across said reactive windings for controlling the conductivities of said electric discharge means to maintain constant equal voltages across said reactive windings.

JACK G. SMITH.

References Cited in the file of this patent

UNITED STATES PATENTS

| Number | Name | Date |
| --- | --- | --- |
| 492,480 | Bradley | Feb. 28, 1893 |
| 551,809 | Bradley | Dec. 24, 1895 |
| 2,253,053 | Stevens | Aug. 19, 1941 |
| 2,443,006 | Johnson | June 8, 1948 |
| 2,453,263 | Potter | Nov. 9, 1948 |
| 2,467,863 | Short | Apr. 19, 1949 |